(12) United States Patent
Chapman

(10) Patent No.: US 10,451,491 B2
(45) Date of Patent: Oct. 22, 2019

(54) SYSTEM AND METHOD TO DETERMINE TOTAL AIR TEMPERATURE FROM TURBOFAN BYPASS FLOW TEMPERATURE

(71) Applicant: HONEYWELL INTERNATIONAL INC., Morristown, NJ (US)

(72) Inventor: Gregory J. Chapman, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 792 days.

(21) Appl. No.: 14/844,326

(22) Filed: Sep. 3, 2015

(65) Prior Publication Data

US 2017/0067785 A1    Mar. 9, 2017

(51) Int. Cl.
G01K 13/02 (2006.01)

(52) U.S. Cl.
CPC .................. G01K 13/028 (2013.01)

(58) Field of Classification Search
CPC ............................ G01K 13/028; G01K 13/02
See application file for complete search history.

(56) References Cited

U.S. PATENT DOCUMENTS

| | | | |
|---|---|---|---|
| 6,350,103 B1 | 2/2002 | Keisuke et al. | |
| 6,543,298 B2 | 4/2003 | Cronin et al. | |
| 6,931,835 B2* | 8/2005 | Chapman | F02C 9/28 60/226.1 |
| 7,111,982 B1 | 9/2006 | Swonger, Jr. | |
| 7,313,963 B2 | 1/2008 | Kuznar | |
| 7,974,812 B2 | 7/2011 | Brivet et al. | |
| 8,560,203 B2* | 10/2013 | Calandra | F01D 25/02 244/134 R |
| 8,992,081 B2 | 3/2015 | Ireland et al. | |
| 2009/0306927 A1 | 12/2009 | Brivet et al. | |
| 2012/0185116 A1* | 7/2012 | DeFrancesco | B64D 13/00 701/3 |
| 2014/0037430 A1* | 2/2014 | Thorpe | G01K 13/028 415/118 |
| 2014/0064330 A1 | 3/2014 | Agami et al. | |
| 2015/0057960 A1 | 2/2015 | Dupont De Dinechin | |
| 2015/0093244 A1 | 4/2015 | Wigen et al. | |

OTHER PUBLICATIONS

Extended EP Search Report for Application No. EP 16186169.5-1555 dated Jan. 26, 2017.

* cited by examiner

Primary Examiner — Leslie J Evanisko
Assistant Examiner — Leo T Hinze
(74) Attorney, Agent, or Firm — Lorenz & Kopf, LLP

(57) ABSTRACT

A system and method for calculating aircraft total air temperature from bypass flow temperature in a turbofan gas turbine engine having a bypass flow duct includes sensing aircraft speed (M), sensing engine fan speed ($N_1$), sensing core engine speed ($N_2$), and sensing bypass air flow temperature ($T_{15}$) in the bypass flow duct. Total air temperature (TAT) is calculated as a function of the sensed aircraft speed, the sensed engine fan speed, the sensed core engine speed, and the sensed bypass air flow temperature. In some embodiments, fan bleed airflow is determined, and a correction is applied to the sensed bypass airflow temperature, and aircraft total air temperature (TAT) is further based on the corrected bypass airflow temperature.

9 Claims, 2 Drawing Sheets

SYSTEM AND METHOD TO DETERMINE TOTAL AIR TEMPERATURE FROM TURBOFAN BYPASS FLOW TEMPERATURE

TECHNICAL FIELD

The present invention generally relates to aircraft total air temperature (TAT) measurement, and more particularly relates to a system and method for calculating TAT from turbofan bypass flow temperature.

BACKGROUND

Most commercial aircraft are equipped with temperature probes that are used to measure external (e.g., ambient) total air temperature. These aircraft total air temperature (TAT) probes are typically mounted on an aircraft body or in an engine inlet. The temperatures supplied from TAT probes mounted on an aircraft body are often used in the calculation of airspeed. The temperatures supplied from TAT probes mounted in an engine inlet are often used in engine power setting, guide vane scheduling, and surge bleed (handling) valve scheduling. Thus, accurate TAT measurement can be important.

The TAT probes, whether mounted on the aircraft or in an engine inlet, are subject to icing. The TAT probes, when iced, can misreport the true total air temperature. Thus, many TAT probes include a heating feature to inhibit such icing. Although the heating feature can adversely impact the reported temperature, the impact can be minimized via known compensating algorithms. Even so, the heating feature may not guarantee ice free operation of the TAT probes, particularly when operating in an environment containing ice crystals. Moreover, enablement of the heating feature is typically a pilot action. Should the pilot not enable the heating feature in a timely manner, the TAT probes can become iced, and the misreport the true total air temperature. In addition, the process of probe icing is sufficiently slow that it can go undetected.

Hence, there is a need for a system and method of determining total air temperature without relying on TAT probes that are mounted on the aircraft and/or in an engine inlet. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for calculating aircraft total air temperature from bypass flow temperature in a turbofan gas turbine engine having a bypass flow duct includes sensing aircraft speed (M), sensing engine fan speed ($N_1$), sensing core engine speed ($N_2$), and sensing bypass air flow temperature ($T_{15}$) in the bypass flow duct. Total air temperature (TAT) is calculated as a function of the sensed aircraft speed, the sensed engine fan speed, the sensed core engine speed, and the sensed bypass air flow temperature.

In another embodiment, a system for determining aircraft total air temperature includes a turbofan gas turbine engine, a bypass air flow temperature sensor, a fan air valve, and a processor. The turbofan gas turbine engine includes a fan, a turbine, and a bypass flow duct. The bypass air flow temperature sensor is disposed within the bypass flow duct, and is configured to sense bypass airflow temperature and supply a bypass air flow temperature signal representative thereof. The fan air valve is coupled to the turbofan gas turbine engine and is coupled to receive valve position commands. The fan air valve is configured, in response to the valve position commands, to move to a commanded fan air valve position and thereby control fan bleed airflow from the turbofan gas turbine engine. The processor is coupled to receive the bypass air flow temperature signal and the valve position commands. The processor is configured, in response to at least the bypass air flow temperature signal and the valve position commands, to determine the aircraft total air temperature (TAT).

In yet another embodiment, a system for determining aircraft total air temperature includes a turbofan gas turbine engine, a bypass air flow temperature sensor, a fan air valve, an aircraft speed sensor, a fan speed sensor, a turbine speed sensor, and a processor. The turbofan gas turbine engine includes a fan, a turbine, and a bypass flow duct. The bypass air flow temperature sensor is disposed within the bypass flow duct, and is configured to sense bypass airflow temperature and supply a bypass air flow temperature signal representative thereof. The fan air valve is coupled to the turbofan gas turbine engine and is coupled to receive valve position commands. The fan air valve is configured, in response to the valve position commands, to move to a commanded fan air valve position and thereby control fan bleed airflow from the turbofan gas turbine engine. The aircraft speed sensor is configured to sense aircraft speed and supply an aircraft speed signal representative thereof. The fan speed sensor is configured to sense engine fan speed ($N_1$) and supply a fan speed signal representative thereof. The turbine speed sensor is configured to sense turbine speed ($N_2$) and supply a turbine speed signal representative thereof. The processor is coupled to receive the bypass air flow temperature signal, the valve position commands, the aircraft speed signal, the fan speed signal, and the turbine speed signal. The processor is configured, upon receipt of these signals to (i) derive fan bleed airflow based in part on the fan air valve position, (ii) apply a correction to the sensed bypass airflow temperature, and (iii) calculate aircraft total air temperature (TAT) using the corrected bypass airflow temperature signal, the aircraft speed signal, the fan speed signal, and the turbine speed signal.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
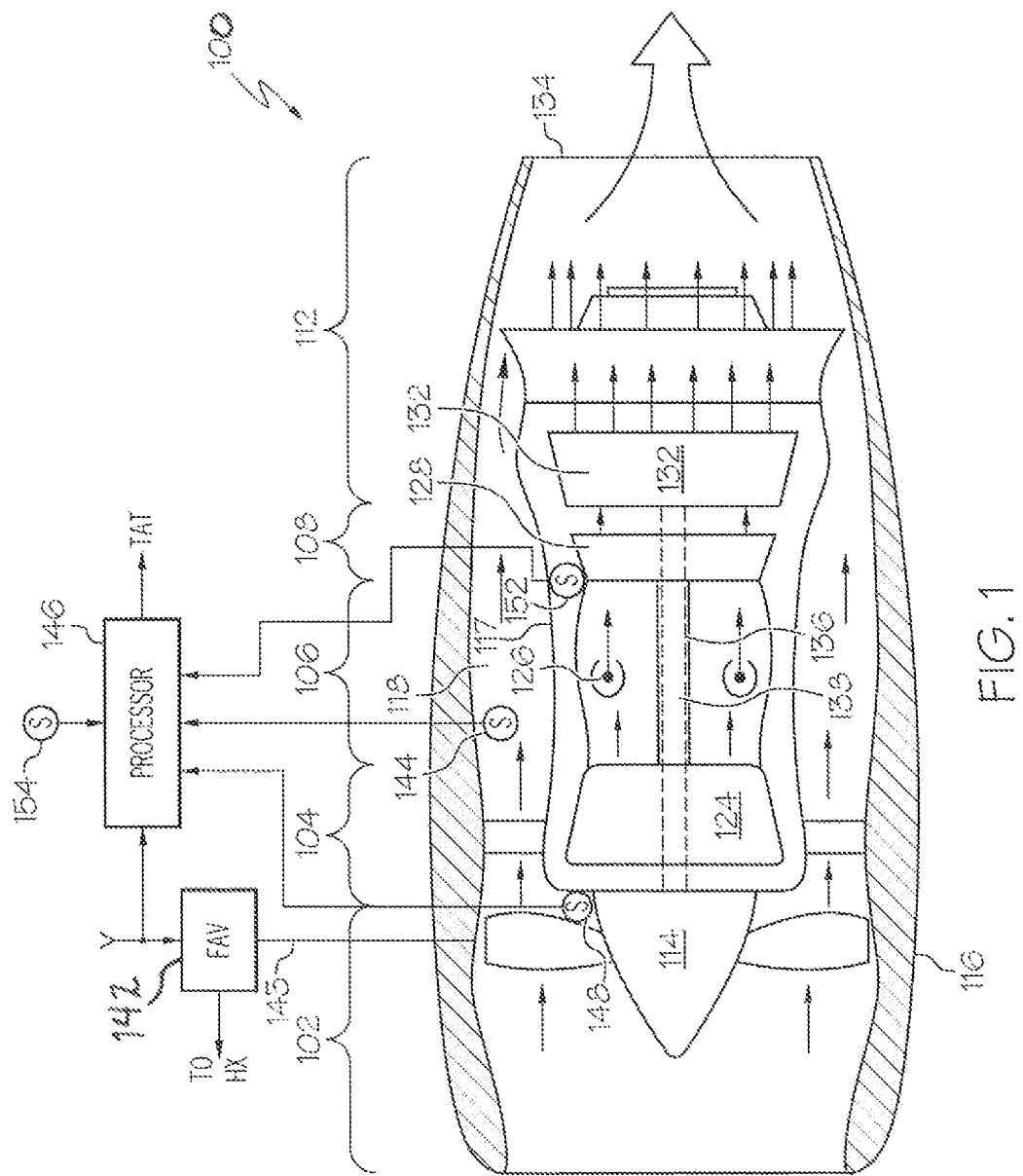
FIG. 1 depicts a simplified cross section view of one embodiment of a turbofan gas turbine propulsion engine.

Referring to FIG. 1, a simplified cross section view of a turbofan gas turbine propulsion engine 100 is depicted and includes an intake section 102, a compressor section 104, a combustion section 106, a turbine section 108, and an exhaust section 112. The intake section 102 includes a fan 114, which is mounted in a fan case 116. The fan 114 draws air into the intake section 102 and accelerates it. A fraction of the accelerated air exhausted from the fan 114 is directed through a bypass duct 118 defined between the fan case 116 and an engine cowl 117, and provides a forward thrust. The remaining fraction of air exhausted from the fan 114 is directed into the compressor section 104.

The compressor section 104 may include one or more compressors 124, which raise the pressure of the air directed into it from the fan 114, and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel that is controllably supplied to the combustor assembly 126 from a non-illustrated fuel source. The fuel and air mixture is combusted, and the high energy combusted air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine 102 could be configured with more or less than this number of turbines. No matter the particular number, the combusted air mixture from the combustion section 106 expands through each turbine 128, 132, causing it to rotate. The combusted air mixture is then exhausted through a propulsion nozzle 134 disposed in the exhaust section 112, providing additional forward thrust. As the turbines 128 and 132 rotate, each drives equipment in the engine 102 via concentrically disposed shafts or spools. Specifically, the high pressure turbine 128 drives the compressor 124 via a high pressure spool 136, and the low pressure turbine 132 drives the fan 114 via a low pressure spool 138.

As is generally known, engine bleed air from a plurality of non-illustrated compressor stage ports may be selectively supplied to various non-illustrated bleed air loads via a non-illustrated heat exchanger. The heat exchanger receives the engine bleed air and a flow relatively cool fan air from the fan 118 (or from a suitable point in the gas turbine engine bypass duct downstream of the fan). In the heat exchanger, the relatively cool fan air cools the relatively hot engine bleed air to a desired temperature. The fan air is selectively supplied to the heat exchanger via a fan air valve (FAV) 142.

The FAV 142 is mounted on a fan air conduit 143 that is coupled to, and is in fluid communication with, the bypass duct 118. The FAV 142 is coupled to receive valve position commands from a non-illustrated bleed air system controller. The FAV 142 is configured, in response to the valve position commands, to move to the commanded fan air valve position and thereby control fan bleed air flow from the turbofan gas turbine engine 100 to the heat exchanger, to thereby control the temperature of the engine bleed air exiting the heat exchanger.

FIG. 1 also depicts a plurality of other devices, such as a bypass airflow temperature sensor 144 and a processor 146. The bypass airflow temperature sensor 144 is disposed within the bypass flow duct 118. The bypass airflow temperature sensor 144 is configured to sense bypass airflow temperature and supply a bypass air flow temperature signal representative thereof to the processor 146.

The processor 146 is coupled to receive the bypass air flow temperature signal from the bypass airflow temperature sensor 144. As FIG. 1 also depicts, the processor 146 is also coupled to receive the valve position commands that are supplied to the FAV 142. The processor 146 is configured, in response to at least the bypass airflow temperature signal and the valve position commands, to determine the aircraft total air temperature (TAT). Although depicted as a stand-alone device, it will be appreciated that the processor 146 may be implemented as part of a non-illustrated engine controller, as part of the non-illustrated bleed air system controller, or as part of any one of numerous other engine-related or aircraft-related systems or subsystems. It will additionally be appreciated that the methodology implemented in the processor 146 to determine aircraft TAT from at least the bypass airflow temperature signal and the valve position commands may vary. One particular methodology will now be described in more detail.

One particular methodology implemented in the processor 146 to determine TAT uses an empirically derived equation to calculate a value of aircraft TAT from the sensed bypass airflow temperature, a plurality of sensed engine parameters, and sensed aircraft speed. The sensed engine parameters include fan speed (N1) and core engine speed (N2). Thus, as FIG. 1 further depicts, the engine 100 preferably additionally includes a fan speed sensor 148 and a turbine speed sensor 152. The fan speed sensor 148 is configured to sense engine fan speed ($N_1$) and supply a fan speed signal representative thereof to the processor 146, and the turbine speed sensor 152 is configured to sense core engine speed ($N_2$) and supply a core engine speed signal representative thereof to the processor 146. One or more aircraft speed sensors 154 (only one depicted) that are each configured to sense aircraft speed, supply an aircraft speed signal representative of sensed aircraft speed to the processor.

The processor 146, upon receiving the bypass airflow temperature signal, the aircraft speed signal, the fan speed signal, and the core engine speed signal, calculates aircraft TAT according to an empirically derived equation. One example of such an equation is as follows:

$$TAT=(T_{15}-k_0-k_1M_n-k_3N_1-k_4N_2-k_5N_1^2)/k_2,$$

where:
$k_0$, $k_1$, $k_2$, $k_3$, $k_4$, and $k_5$ are each experimentally determined coefficients, which may vary from engine type to engine type,
$T_{15}$ is sensed bypass airflow temperature,
$M_n$ is aircraft speed in Mach number,
$N_1$ is fan speed expressed in units of percent, and
$N_2$ is core engine speed expressed in units of percent.

Before proceeding further, it will be appreciated that the above equation is merely exemplary of one equation that the skilled person could derive. It will additionally be appreciated that the engine- and aircraft-related variables ($M_n$, $N_1$, $N_2$), the constants, and any associated exponents may vary.

Figure 2:
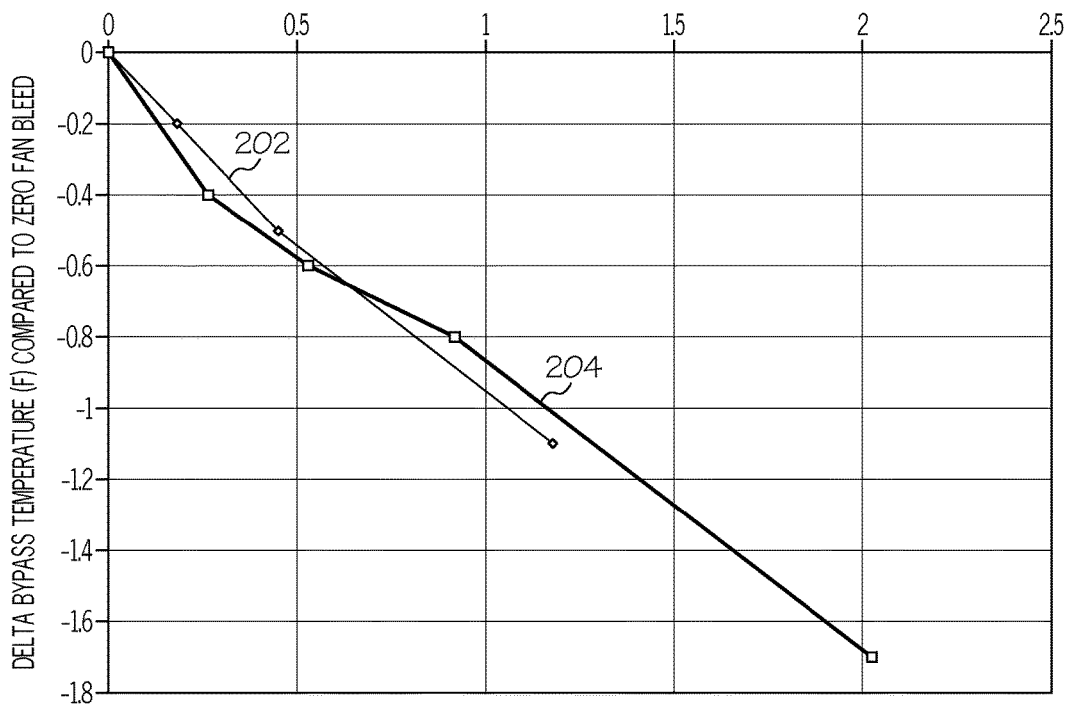
FIG. 2 graphically depicts the change in bypass airflow temperature (compared to zero fan bleed airflow) versus fan bleed airflow (in percentage) temperature.

Returning to the description, it may be readily appreciated that variations in fan bleed airflow may impact the calculated aircraft TAT. The equation that is used to calculate TAT, such as the one above, may be (and typically is) derived for zero fan bleed conditions. Thus, when fan bleed is present, a method may be needed to adjust the sensed bypass airflow temperature to a zero bleed condition. Such an adjustment is illustrated in FIG. 2, which depicts the change in bypass airflow temperature (compared to zero fan bleed airflow) versus fan bleed airflow (in percentage) temperature at two different flight conditions 202 and 204. The processor 146 is also configured to implement a process to compensate for this impact. In particular, the processor 146 may be configured to determine fan bleed airflow and apply an appropriated adjustment to the sensed bypass airflow temperature based on the determined fan bleed airflow.

It will be appreciated that the equation used to calculate TAT, such as the one above, could be derived for any fan bleed condition (reference condition) the skilled person selects. An appropriate adjust, similar to what is depicted in FIG. 2, could then be developed to provide the adjustment between the reference condition and any other fan bleed condition.

Figure 3:
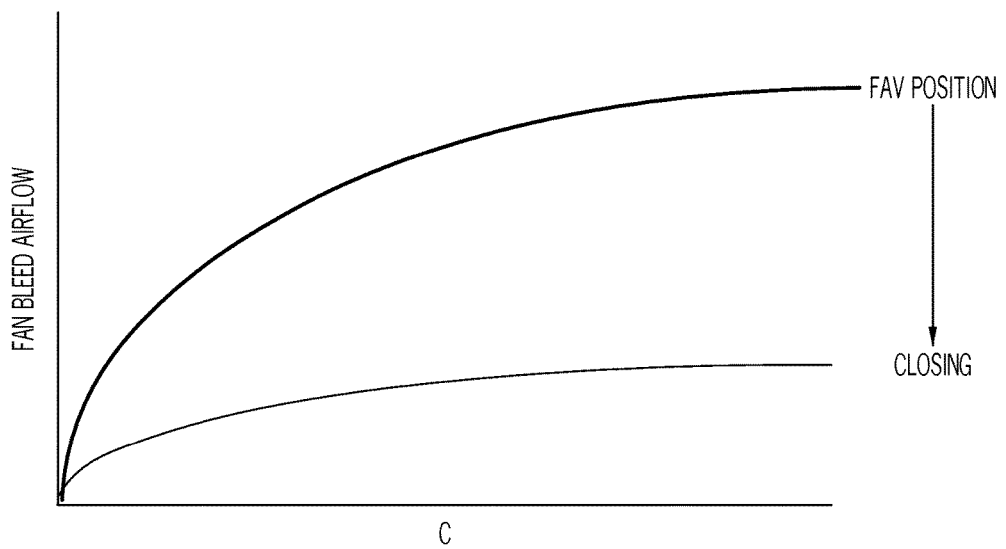
FIG. 3 graphically depicts how fan bleed airflow varies, at a plurality of specific FAV positions, with flight condition and engine power setting.

It will be appreciated that the processor 146 may determine fan bleed airflow using any one of numerous techniques. For example, the processor 146 may determine fan bleed airflow from a fan bleed airflow signal supplied thereto from a fan bleed airflow sensor 156 (depicted in phantom in FIG. 1). The processor 146 may alternatively be configured to derive fan bleed airflow from FAV position, which in some embodiments may be determined/measured from FAV torque. That is, and as shown more clearly in FIG. 3, fan bleed airflow, at a specific FAV position, varies with what is referred to herein as a correlation value (C).

The processor 146 is thus additionally configured to calculate the correlation value (C), which is based on current flight conditions and engine power setting according to the following equation:

$$C = (1 + 0.2 * M_n^2)^{3.5} * k \left(\frac{N_1}{\sqrt{\theta}}\right)^n,$$

where:
k and n are each experimentally determined coefficients,
$M_n$ is aircraft speed in Mach number, and
$N_1$ is fan speed expressed in units of percent.

The processor 146, using the calculated correlation value and the determined FAV position, may then determine the fan bleed airflow based on the FAV position and the calculated correlation value. For example, the processor 146 may be configured to retrieve the fan bleed airflow from a look-up table that includes values corresponding to a family of curves, such as those depicted in FIG. 3.

The system and method disclosed herein allow the determination of aircraft total air temperature without relying on TAT probes that are mounted on the aircraft and/or in an engine inlet.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for determining aircraft total air temperature, comprising:
a turbofan gas turbine engine comprising a fan, a turbine, and a bypass flow duct;
a bypass air flow temperature sensor disposed within the bypass flow duct, the bypass air flow temperature sensor configured to sense bypass airflow temperature and supply a bypass air flow temperature signal representative thereof;

a fan air valve coupled to the turbofan gas turbine engine and coupled to receive valve position commands, the fan air valve configured, in response to the valve position commands, to move to a commanded fan air valve position and thereby control fan bleed airflow from the turbofan gas turbine engine; and a processor coupled to receive the bypass air flow temperature signal and the valve position commands, the processor configured, in response to at least the bypass air flow temperature signal and the valve position commands, to determine the aircraft total air temperature (TAT).

2. The system of claim 1, further comprising:

an aircraft speed sensor configured to sense aircraft speed and supply an aircraft speed signal representative thereof to the processor;

a fan speed sensor configured to sense engine fan speed ($N_1$) and supply a fan speed signal representative thereof to the processor; and a turbine speed sensor configured to sense core engine speed ($N_2$) and supply a core engine speed signal representative thereof to the processor, wherein the processor is further configured to:
(i) derive fan bleed airflow based in part on the fan air valve position,
(ii) apply a correction to the sensed bypass airflow temperature, and
(iii) calculate aircraft total air temperature (TAT) using the corrected bypass airflow temperature signal, the aircraft speed signal, the fan speed signal, and the turbine speed signal.

3. The system of claim 2, wherein processor calculates aircraft TAT according to:

$$TAT = (T_{15} - k_0 - k_1 M_n - k_3 N_1 - k_4 N_2 - k_5 N_1^2)/k_2,$$

where:
$k_0$, $k_1$, $k_2$, $k_3$, $k_4$, and $k_5$ are each experimentally determined coefficients,
$M_n$ is aircraft speed in Mach number,
$N_1$ is fan speed expressed in units of percent, and
$N_2$ is core engine speed expressed in units of percent.

4. The system of claim 2, wherein the processor is configured to derive fan bleed airflow by:

calculating a correlation value using the sensed aircraft speed and the sensed engine fan speed; and using the calculated correlation value and the determined FAV position to retrieve the fan bleed airflow from a look-up table.

5. The system of claim 4, wherein the processor is configured to calculate the correlation value (C) according to:

$$C = (1 + 0.2 * M_n^2)^{3.5} * k \left(\frac{N_1}{\sqrt{\theta}}\right)^n,$$

where:
k and n are each experimentally determined coefficients,
$M_n$ is aircraft speed in Mach number, and
$N_1$ is fan speed expressed in units of percent.

6. A system for determining aircraft total air temperature, comprising:

a turbofan gas turbine engine comprising a fan, a turbine, and a bypass flow duct;

a bypass air flow temperature sensor disposed within the bypass flow duct, the bypass air flow temperature sensor configured to sense bypass airflow temperature and supply a bypass air flow temperature signal representative thereof;

a fan air valve coupled to the turbofan gas turbine engine and coupled to receive valve position commands, the fan air valve configured, in response to the valve position commands, to move to a commanded fan air valve position and thereby control fan bleed airflow from the turbofan gas turbine engine;

an aircraft speed sensor configured to sense aircraft speed and supply an aircraft speed signal representative thereof;

a fan speed sensor configured to sense engine fan speed ($N_1$) and supply a fan speed signal representative thereof;

a turbine speed sensor configured to sense turbine speed ($N_2$) and supply a turbine speed signal representative thereof; and a processor coupled to receive the bypass air flow temperature signal, the valve position commands, the aircraft speed signal, the fan speed signal, and the turbine speed signal, the processor configured, upon receipt of these signals to:
(i) derive fan bleed airflow based in part on the fan air valve position,
(ii) apply a correction to the sensed bypass airflow temperature, and
(iii) calculate aircraft total air temperature (TAT) using the corrected bypass airflow temperature signal, the aircraft speed signal, the fan speed signal, and the turbine speed signal.

7. The system of claim 6, wherein processor calculates aircraft TAT according to:

$$TAT = (T_{15} - k_0 - k_1 M_n - k_3 N_1 - k_4 N_2 - k_5 N_1^2)/k_2,$$

where:
$k_0$, $k_1$, $k_2$, $k_3$, $k_4$, and $k_5$ are each experimentally determined coefficients,
$M_n$ is aircraft speed in Mach number,
$N_1$ is fan speed expressed in units of percent, and
$N_2$ is core engine speed expressed in units of percent.

8. The system of claim 6, wherein the processor is configured to derive fan bleed airflow by:

calculating a correlation value using the sensed aircraft speed and the sensed engine fan speed; and using the calculated correlation value and the determined FAV position to retrieve the fan bleed airflow from a look-up table.

9. The system of claim 8, wherein the processor is configured to calculate the correlation value (C) according to:

$$C = (1 + 0.2 * M_n^2)^{3.5} * k \left(\frac{N_1}{\sqrt{\theta}}\right)^n,$$

where:
k and n are each experimentally determined coefficients,
$M_n$ is aircraft speed in Mach number, and
$N_1$ is fan speed expressed in units of percent.

* * * * *